Oct. 29, 1968     O. J. B. ORWIN     3,407,751
FLOOR CONVEYORS Filed April 25, 1966            7 Sheets-Sheet 1

Fig.1.

INVENTOR:
OLAF JOHN BARCLAY ORWIN

BY Kurt Kelman
AGENT

Oct. 29, 1968   O. J. B. ORWIN   3,407,751
FLOOR CONVEYORS

Filed April 25, 1966   7 Sheets-Sheet 2

Fig. 2.

INVENTOR:
OLAF JOHN BARCLAY ORWIN
BY Kurt Kelman
AGENT

Oct. 29, 1968    O. J. B. ORWIN    3,407,751
FLOOR CONVEYORS
Filed April 25, 1966    7 Sheets-Sheet 3

Fig.3.

INVENTOR:
OLAF JOHN BARCLAY ORWIN
BY Kurt Kelman
AGENT

Fig.7.

3,407,751
FLOOR CONVEYORS
Olaf John Barclay Orwin, Quinton, Birmingham, England, assignor to Fisher & Ludlow Limited, Birmingham, England, a British company
Filed Apr. 25, 1966, Ser. No. 545,034
Claims priority, application Great Britain, Apr. 27, 1965, 17,584/65
8 Claims. (Cl. 104—172)

ABSTRACT OF THE DISCLOSURE

A floor conveyor comprising a pair of powered trolley driving chains disposed beneath the floor, each provided with trolley driving dogs movable relative to their associated chain and which overlap with one another for the purpose of transferring trolleys from the control of one chain to the other.

---

This invention relates to floor conveyors for conveying goods of the kind herein called the kind specified, comprising a pair of power advanced driving chains each disposed beneath a corresponding slot provided in the floor, and a plurality of wheeled goods supporting trolleys having dependent driving bars which in operation extend within one or the other of the two slots, and which are engaged at their lower ends with driving dogs provided on the driving chains and transfer means for transferring the goods supporting trolleys from the control of one to the other of the driving chains at a junction or other transfer position provided in the floor, at which position the two slots merge with one another.

Hitherto, in floor conveyors of the kind specified, the driving dogs have been rigidly mounted on the driving chains so as to be fixed in relation thereto during operation. In such an arrangement it is not satisfactory to facilitate the transfer of the trolleys from one driving chain to another by making the lower ends of the driving bars carried by the trolleys of inverted 'T' form, so as to embody a pair of arms, the free ends of which at the position of transfer are each adapted for driving engagement with dogs mounted rigidly on the driving chains, with the two chains at the point of transfer spaced relatively apart by an appreciable distance, as determined by the length of the two arms on each driving bar, so as to avoid any risk of the dogs mounted rigidly on one driving chain fouling similarly mounted dogs on the other driving chain at the position of transfer.

Unless the floor slots were made so wide as undesirably to trap the trolley wheels or the feet of persons walking over the floor, as well as to trap other bodies on the floor, such an arrangement, if adopted, would by the presence of the relatively wide inverted T shaped lower end to each driving bar carried by the trolley, prevent the driving bar from readily being withdrawn clear of the floor slot, as is necessary to permit of the trolleys being manually advanced over the floor at positions spaced away from the floor slot, a procedure which is frequently required with floor conveyors.

It is accordingly necessary for the two driving chains to be brought very close together at the position of transfer, to permit of the driving bars of relatively small transverse width at their lower ends being effectively transferred from one chain to the other. This involves the problem of preventing the rigidly mounted dogs of the two chains fouling one another at the transfer position, for whether the two chains are driven from a common or two separate power sources it is in practice impossible to ensure that the two driving chains advance at precisely the same speed, so as to so synchronise the relative position of the dogs on the two chains as to prevent them from fouling one another. In fact, since the speed of advancement of the chains is quite small, i.e. commonly within the range of 3 to 40 metres per minute, it may often be desirable for one chain to advance at a speed appreciably different to that of the other. Thus, in practice it can be expected that one chain will advance at a speed faster than the other.

According to the present invention, the trolley driving dogs of each of the two chains each comprise two portions which extend in opposite transverse directions relative to their associated chain, with the lateral extremity of each portion of each dog at the position of transfer overlapping in a transverse sense with the lateral extremity of the adjacent portion of the dog on the other chain, so as to permit of a driving bar being advanced by a dog of one chain into the path of a dog of the other chain, and each of the two portions of each dog is movable relative to the associated chain, in a direction both forwardly and towards the longitudinal centre line of the chain and against return loading means in such a manner as to permit of a trolley driving bar advanced by a relatively faster moving chain engaging with a rearwardly directed face of a dog portion on a relatively slower advancing chain to displace such engaged dog portion against its loading means and allow the driving bar to occupy a position in which it can engage with the forwardly directed driving face on the dog of the more slowly advancing chain to be driven therefrom.

Preferably, the two portions constituting each driving chain dog are separate from one another, and are mounted for independent pivotal movement in opposite direction to one another about a vertically extending pivot against spring or other loading means.

Preferably the two separate portions of each dog are so mounted on a common pivot.

Although with the present invention, by reason of the mounting of the two portions of each dog for forward and inward movement relative to the associated chain, the transversely overlapping portions of the dogs of the two chains can engage with each other without damage, i.e. without fouling one another at the position of transfer, preferably the lateral extremity of each portion of each of the dogs on chain conveyor chain is disposed at a horizontal level different from that of the adjacent lateral portions of each of the dogs on the other laterally adjacent chain at the transfer position, so that the lateral extremities of the adjacent dog portions of the two chains overlap by extending one above the other at the transfer position, so that the dogs on the two chains are incapable of engaging with one another at the transfer position.

Preferably, each dog portion is over its entirety disposed at the same horizontal level as by forming each portion as a flat plate, but the portions may each be of stepped configuration with merely their respective lateral extremities at opposite lateral sides of the associated chain disposed at different horizontal levels.

Preferably, each dog portion presents a rearwardly directed face disposed to the lateral side of the axis of pivoting of the dog portion, which face is inclined in a rearward direction towards the longitudinal centre line of the chain, so as to facilitate the aforementioned displacement of each dog portion by a trolley driving bar.

Such inclined disposition of the rearwardly directed face of each dog portion may be provided by forming each dog portion to substantially right angle triangle or quarter circular configuration, as viewed in plan, so as to present a substantially straightforwardly directed bar engaging edge and a straight or curved rearwardly directed outer edge, which is inclined to the direction of advancement of the chain, and is disposed laterally to one side of a vertical longitudinally extending plane, containing the axis of pivoting of such dog portion.

Preferably, the two portions of each dog are arranged to overlap with one another at a position forwardly of their axis of pivoting, the two portions where they overlap being each adapted simultaneously to engage with the trolley driving bar at positions spaced along the length thereof, so that the driving load is shared substantially equally between the two portions constituting each driving dog, whereby undesirable local overloading of the dog is minimized.

In the present Specification, the expressions "front" and "rear" and "forwardly" and "rearwardly" have reference to the designed direction of advancement of the driving chains.

The invention is illustrated in the accompanying drawings, wherein.

Referring to the drawings, and more particularly to FIGURES 1 to 5, the floor conveyor illustrated comprises a pair of driving chains 10, 11 of generally known form, which are independently power advanced in the direction indicated by the arrows in the various figures, from corresponding power driving means 12, 13, of known form. Insofar as each chain, as is customary, is provided with its own power driving means, it is impossible to synchronise precisely the speeds of the two chains. Thus, in practice one of the two chains, e.g. chain 10, will be driven at a speed somewhat faster than that of the other chain, i.e. chain 11.

The two chains 10, 11 are respectively housed within corresponding guideways 14, 15, each respectively communicating at their upper sides with a slot 16, 17 of width less than that of the guideways and of each of the two chains 10, 11; each slot being formed in the known manner in the floor 18, beneath which the guideways 14, 15 and their corresponding chains 10, 11 are disposed.

Figure 1:
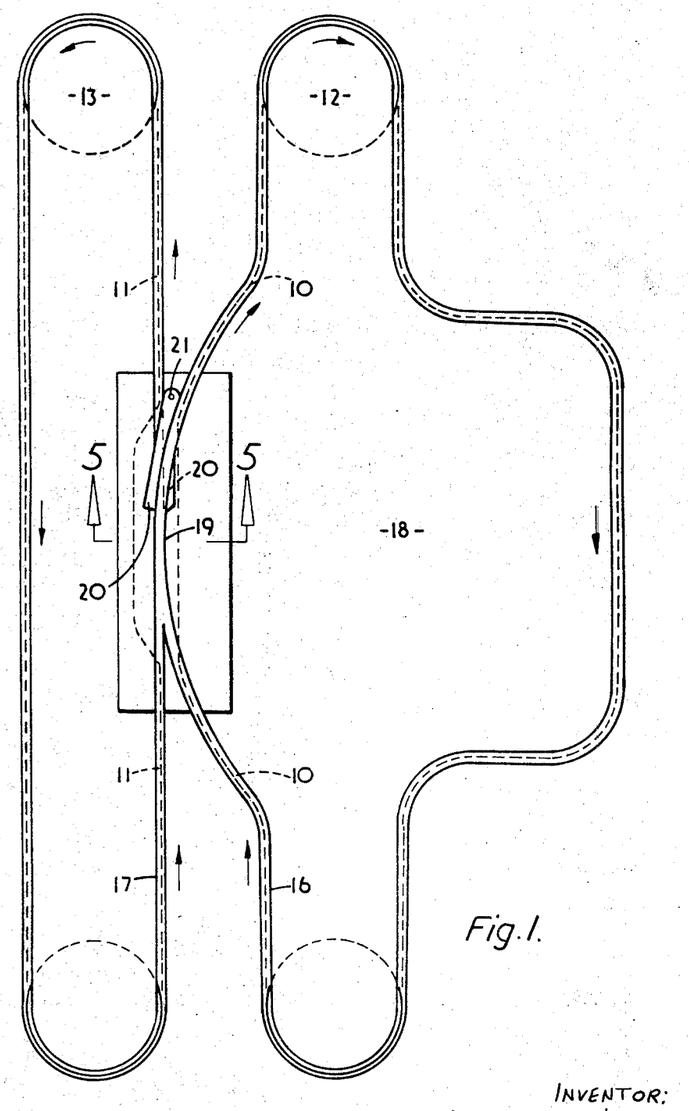
FIGURE 1 is a plan view partly diagrammatic of one form of floor conveyor of the kind specified, embodying this invention.
Figure 2:
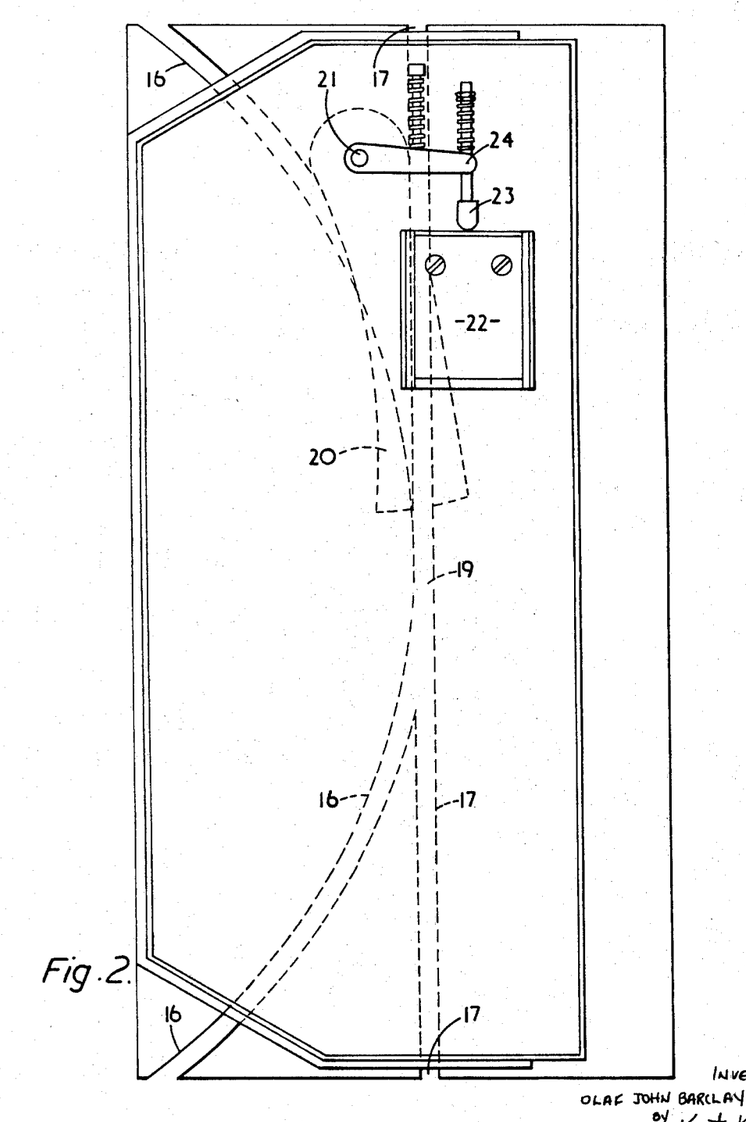
FIGURE 2 is an inverted plan view to a larger scale of part of the construction shown in FIGURE 1.
Figure 3:
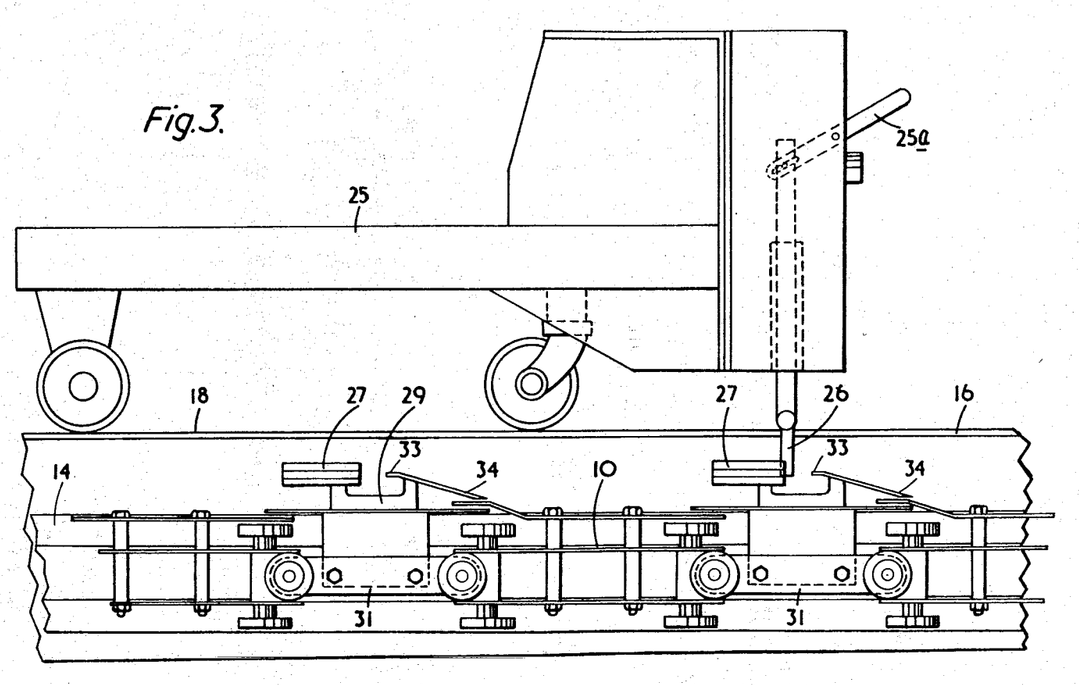
FIGURE 3 is a side elevation to an enlarged scale of part of one of the driving chains in position beneath the floor slot of the construction shown in FIGURE 1 showing also one of the wheeled trolleys.
Figure 5:
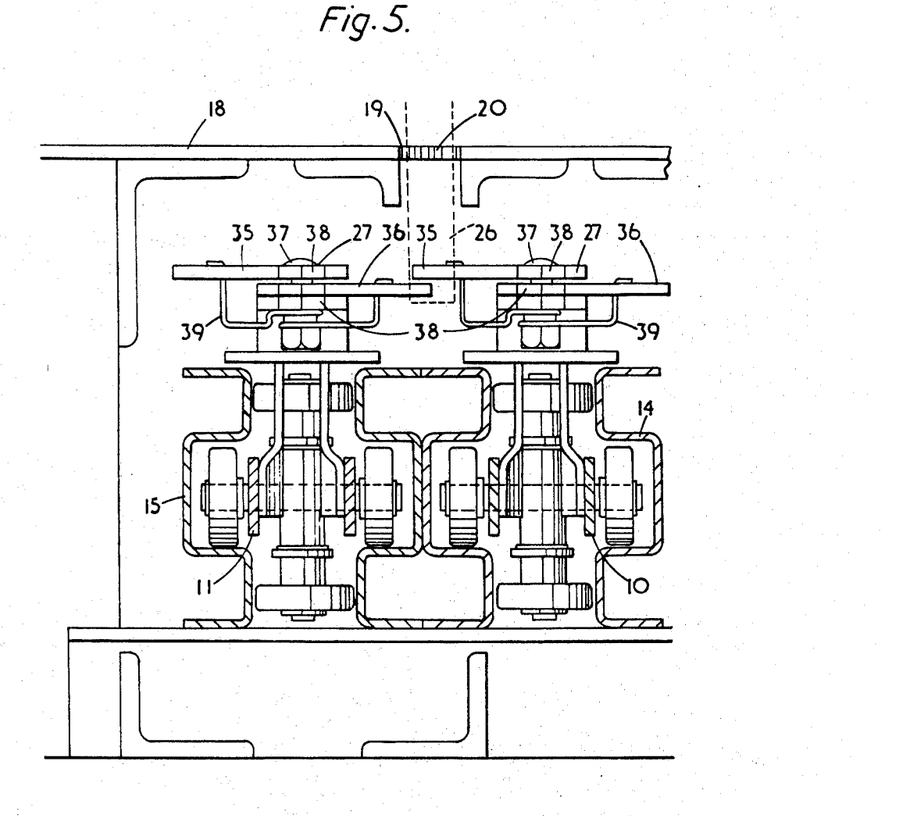
FIGURE 5 is a cross sectional view to an enlarged scale on the line 5—5 of FIGURE 1, showing part of each of the two driving chains, including one of the driving dogs thereof, in position beneath the floor slot at the trolley transfer position.

Each slot 16, 17 extends above the central longitudinal axis of the corresponding chain, and at least one position along the length of the two slots and their associated chains and two chains 10, 11, are, as shown in FIGURES 1 and 5, disposed in close lateral proximity to one another, so as to permit of the transference of the wheeled trolleys, later to be described, from the control of one chain to the other, for example from the faster moving chain 10 to the slower moving chain 11.

At this position of transfer the two floor slots 16, 17 merge into one another at a transfer slot 19, in which works transfer means in the form of a movable switch tongue 20 mounted for pivotal movement at 21 about a vertical axis, so as to be displaceable from the full line to the dashed line position depicted in FIGURE 1, according to whether with the chains advancing in the direction of the arrows in FIGURE 1, it is desired to transfer the wheeled trolleys from the control of chain 10 to the control of chain 11 or vice versa.

As shown in FIGURE 1, the transfer slot 19 is of the same width as that of the other floor slots 16, 17, and to accommodate the two chains and their respective guideways at the transfer slot, the two chains and their guideways are laterally offset from the centre line of the transfer slot 19, so that the centre line of one chain is at one side of the transfer slot, and the centre line of the other chain is at the opposite side.

The track switch 20, which is of known form, is displaced in the known manner by solenoid 22 (see FIGURE 2), the armature 23 of which is connected through arm 24 to the track switch 20, and the solenoid being operated from any conveniently disposed control switch under the control of the operator.

The floor conveyor constituted by each of the two driving chains 10, 11 and the other integers so far described, is provided with a plurality of wheeled trolleys 25 (see FIGURE 3) which are of known form, and have mounted on their forward ends for vertical sliding movement dependent trolley driving bars 26, each of which is adapted to depend through each of the two floor slots 16, 17; which slots as well as the transfer slot 19 are accordingly made of a width only slightly greater than the diameter of the driving bars.

The lower end of each trolley driving bar 26 is adapted for engagement with one of a number of driving dogs 27, provided at intervals along the length of each of the two chains 10, 11, so as by their engagement with the driving bars to advance the trolleys along the floor. The bars 26 are adapted in the known manner, e.g. by lifting mechanism 25a to be raised completely clear of the floor slots 16, 17, to permit of the trolleys 25 being manually advanced along the floor at a position remote from the slots.

Each of these driving dogs 27 is mounted on the rear limb 28 of a channel shaped dog supporting bracket 29 carried (see FIGURES 4 and 5) upon a pair of transversely spaced plates 30 secured to vertically disposed links 31 of the associated driving chain 10, 11.

The front limb 32 of the channel shaped dog supporting bracket 29 carries a retarding dog 33, which is spaced forwardly of the adjacent driving dog 27 by a distance rather greater than the diameter of the trolley driving bar 26, so that this at its lower end can extend between the two dogs 27, 33, to thereby prevent the trolleys with their driving bars in their lower driving position undesirably overrunning the associated chain, for example when advancing in a downhill direction. Each retarding dog 33 is formed with a forwardly and downwardly inclined shoe 34, which is adapted to engage with the underside of a driving bar 26, when in its lowered position, so as partially to raise the same temporarily relative to the trolley, by virtue of its slidable mounting thereon, thus permitting, in the case where a driving bar 26 is not yet engaged by a driving dog on a chain, of the latter and the associated retarding dog 33 advancing forwardly relative to the driving bar, so as to bring the latter into a position for engagement with the adjacent driving dog 27.

In accordance with the present invention, each of the driving dogs 27 is formed as two portions 35, 36, which in the arrangement illustrated are separate from one another. Each portion 35, 36 is in the form of a metal plate of substantially right angle triangle configuration, as viewed in plan, the two portions 35, 36 being disposed at different horizontal levels, and being each mounted for pivotal movement upon a common vertically extending pivot pin 37, so that adjacent the pivot pin and directly on the forward side thereof, the two portions of each driving dog 27 overlap with one another.

Figure 6:
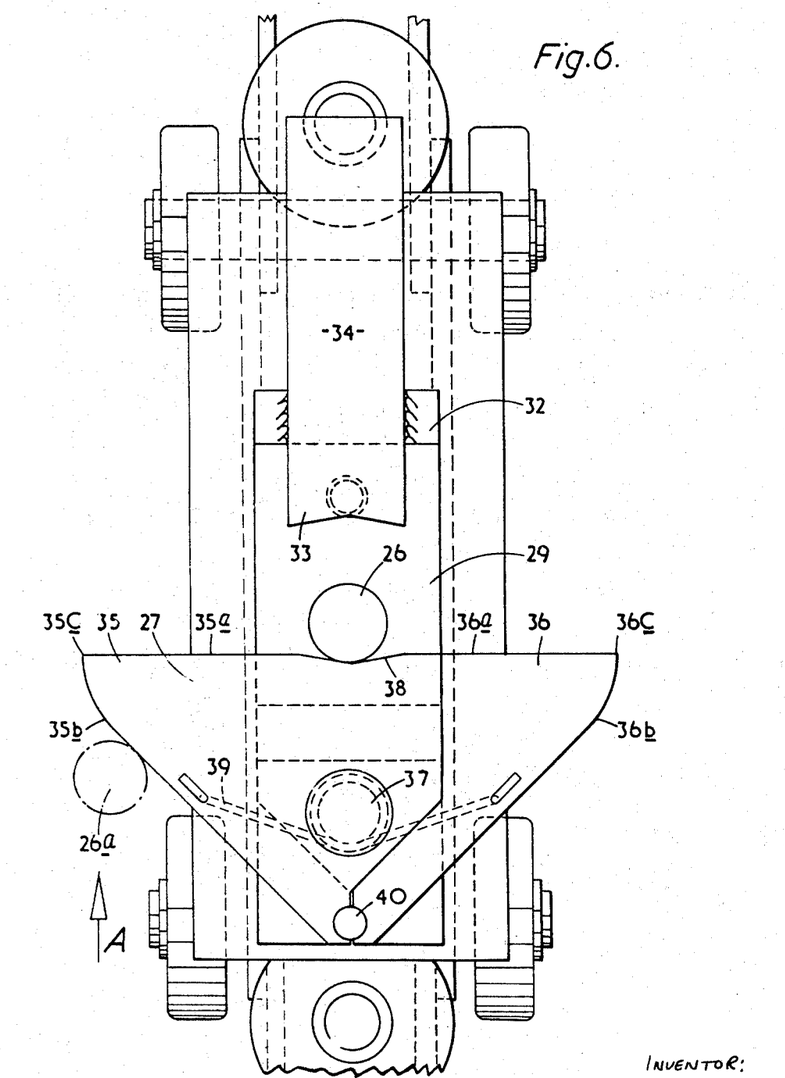
FIGURE 6 is a plan view of part of the driving chain, including one of the driving dogs, depicted in FIGURE 5.

The two dog portions 35, 36 present a forwardly directed trolley bar engaging driving face 35a, 36a respectively, which are in the same common vertical plane perpendicularly transverse to the direction of advancement, considering the two portions 35, 36 in the driving position depicted in full out line in FIGURE 6.

Figure 4:
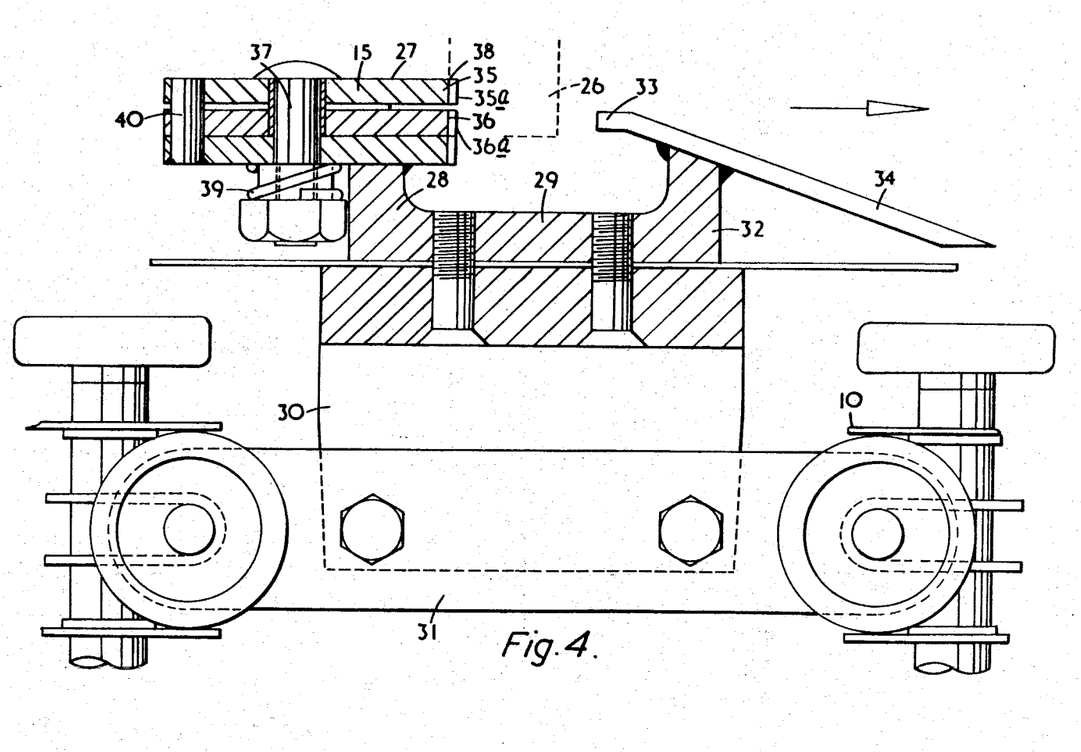
FIGURE 4 is a side elevation to an enlarged scale of part of the construction shown in FIGURE 3.

With the driving bar 26 in the driving position, it will normally, by reason of the disposition of the floor slot 16, 17 except at the junction transfer slot 19, be directly above the centre line of one or the other of the two chains 10, 11, and will, as shown in FIGURES 4 and 6, be engaged by the two dog portions 35, 36 of a dog 27 at a position directly in front of the centre of the pivot pin 37, so that the driving load is shared equally and symmetrically between the two portions of each chain dog 27, and the driving chain is accordingly symmetrically loaded.

To assure that such symmetrical loading is maintained despite slight variations in the position of the floor slot in relation to the centre line of the associated chain, the aforesaid dog driving faces 35a, 36a at positions directly forwardly of the pin 37, are each formed with a shallow V shaped driving bar locating recess 38; with the two recesses of each dog 27 vertically aligned.

The two portions are retained in this driving position by a spring 39, which is so arranged as to displace the two portions in opposite directions about the pivot 37, so as to bring their rear extremities into engagement with a vertically extending stop pin 40, carried on dog supporting bracket 29, which through rear bracket limb 28 serves to connect the pivot pin 37 and associated dog 27 to the bracket 29.

Each dog portion 35, 36 has its respective outer face 35b, 36b inclined or chamfered in relation to the direction of advancement of the associated chain, so that a trolley driving bar 26, at a laterally disposed position, e.g. 26a in FIGURE 6 engaging with such inclined face of either dog portion and advancing relatively faster in the direction of the arrow 'A,' will cause the so engaged dog portion to swing in a forward direction against the loading of spring 39 about its pivot 37, thereby permitting of the driving bar 26 moving forwardly relative to the dog 27 into a position for driving engagement with its forwardly directed driving bar engaging faces 35a, 36a; the so engaged dog portion swinging rearwardly under its spring loading when the bar 26 has sufficiently advanced to clear the so previously engaged dog portion.

As shown in FIG. 5, by reason of the construction of each dog 27 in two portions disposed at the different horizontal levels, each dog portion on one of the two driving chains is adapted along its lateral edge furthest from pin 37 to extend above or below and thus so overlap with another dog portion of a similar dog 27 on the other of the two driving chains.

Thus, referring to FIGURE 5, the upper dog portion 35 is adapted to overlap above lower portion 36 of the laterally adjacent chain.

The arrangement permits of a trolley driving bar 26 having its lower end of straight as opposed to inverted T configuration, when engaged by a portion of one driving dog, to be brought by the relative convergence of the two floor slots 16, 17 at transfer slot 19 into driving engagement with a dog portion of one of the dogs of the laterally adjacent chain, so as to transfer the driving bar, and thus the trolley from the control of one chain to the other, for advancement above the appropriate floor slot.

Figure 7:
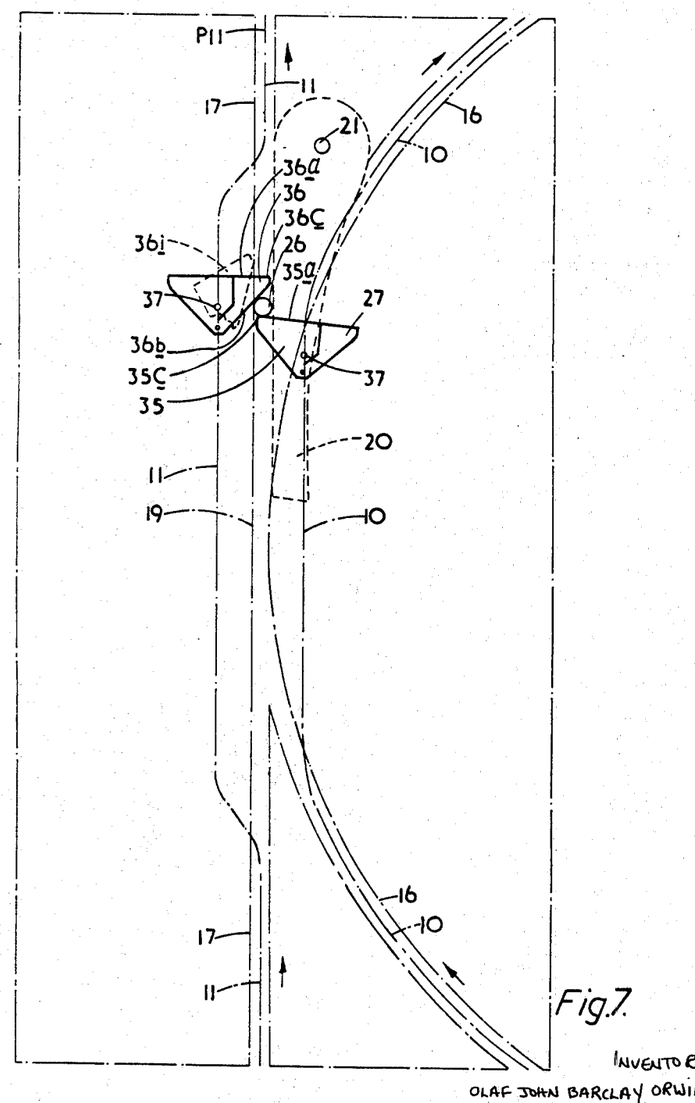
FIGURE 7 is a diagrammatic plan view depicting the transfer of a driving bar of a wheeled trolley from one driving chain to the other at the transfer position depicted in FIGURE 1.

The foregoing will be most clearly understood by reference to FIGURE 7, which illustrates the transfer of a trolley driving bar 26, and thus the associated trolley from the control of a relatively faster moving chain 10, to the control of a relatively slower moving chain 11, in the transfer slot 19. For this purpose the movable switch tongue 20 has been displaced by solenoid 22 into a position, as shown in dashed outline in FIGURE 7, for diverting trolley driving bar 26 from floor slot 16, associated with faster moving chain 10 to floor slot 17, associated with slower moving chain 11.

At this position in which, referring to FIGURE 1, the trolley driving bar 26 now extends within transfer slot 19, by reason of the above mentioned lateral displacement of each of the two chains 10, 11 in relation to the centre of the transfer slot 19, trolley driving bar 26 will necessarily be displaced in a lateral direction in relation to the faster moving chain 10, by which it is still being driven. Thus, referring to FIGURE 7, trolley driving bar 26 is displaced towards the lateral extremity of 35c of the particular dog portion 35 of driving dog 27 of chain 10, which is in driving engagement with bar 26. In this position bar 26 is now, as shown in FIGURE 7, completely beyond the adjacent lateral side of chain 10, although still in engagement with the forwardly directed face 35a of dog portion 35, adjacent its lateral extremity 35c.

Driving bar 26 is now in the path of advancement of the lateral extremity 36b of laterally adjacent dog portion 36 of each driving dog 27 on the relatively slower advancing chain 11, towards which it is diverted or transferred by switch tongue 20 extending in the full line position as depicted in FIGURE 1, and in the dashed line position as depicted in FIGURE 7, so that the switch tongue extends in a direction which is inclined in relation to the adjacent part of slot 16, which is associated with the faster moving chain 10, so as laterally to displace bar 26 away from chain 10 and thus completely clear of the lateral extremity 35c of the driving dog on chain 10, as well as to divert driving bar 26 along floor slot 17.

The angle of inclination of slot 16 to slot 17 in this transfer position, shown in FIG. 7, may be made sufficiently small and the pitch of the driving dogs 27 on the two chains may also be made sufficiently small, having regard to the difference in relative speed between the two chains 10, 11, as to ensure that before the driving bar 26 is displaced by the aforesaid disposition of switch tongue 20 beyond the lateral extremity 35c of dog portion 35 on chain 10, i.e. while still being driven by chain 10, such driving bar is brought into engagement with the inclined outer face 36b of the aforementioned dog portion 36, on the relatively slower chain 11, in respect of which driving bar 26 is being advanced at a relatively faster rate by its continued driving from chain 10.

Thus, by the continued driving from dog portion 35 on chain 10, adjacent dog portion 36 on slower moving chain 11 is compelled to swing in a forward and inward direction towards the central longitudinal plane of chain 11, denoted by line P.11 in FIG. 7, i.e. into the dog portion transfer position indicated in dashed outline at 36i in FIG. 7; thus allowing the relatively faster moving bar 26 to go past dog portion 36 on chain 11.

At the instant of engagement of bar 26 with outer dog face 36b, the lateral extremity 35c of the dog portion 35 on chain 10 overlaps in a vertical sense with the dog portion 36 on chain 11, as is permitted by the aforementioned different horizontal positions of the two dog portions of each driving dog.

As the driving bar 26 is further guided in the direction aforementioned by switch tongue 20, relative to the adjacent path of advancement of faster moving chain 10, driving bar 26 is displaced completely out of the path of dog portion 35 on chain 10, by which time driving bar 26 has advanced forwardly beyond the outer inclined face 36b of dog portion 36i still in its forward and inward position, thus allowing this dog portion 36 to swing rearwardly back into its original position under the loading of spring 39, beyond which position, as indicated in full outline in FIG. 7, each dog portion is positively prevented from moving by the aforementioned stop pin 40.

Thus, the driving bar 26 is now situated forwardly of the forwardly directed face 36a of the aforementioned dog portion 36 on chain 11, and as this chain is continuing to advance, bar 26 will now be engaged by dog portion 36, so that the driving bar and associated trolley 25 will now be advanced solely under the control of chain 11. As the driving bar completes its movement clear of the forward end (in the direction of advancement) of the movable switch tongue 20, it will now be brought into alignment with the aforementioned plane P.11, so as now to be within floor slot 17 in a position for symmetrical engagement by each of the two dog portions 35, 36 of the dog 27 on chain 11.

Insofar as each dog, as is well shown in FIG. 5, has an overall width substantially greater than the overall width of the driving chain, the aforementioned transference of the trolleys is effected without bringing the two chains 10, 11, themselves so close as to foul one another, while insofar as the dogs of the two chains overlap with one another in a vertical sense, as above described, at the position of transference, there is no danger of the dogs 27 themselves fouling one another at such position.

Also, as will be apparent from the above description of what happens at the instant of transfer of a trolley from one chain to another, the movable, i.e. pivotal mounting of each dog portion, as above described, relative to the associated chain, permits of a trolley 25 which is being driven by a relatively faster moving chain 10 at the point of transfer being drivingly engaged by an advancing dog 27 of a relatively slower moving chain 11, such transference being also effected without the relatively moving dogs 27 of the two chains 10, 11 fouling one another at the point of transfer.

It is, of course, perfectly possible with the present invention for the trolleys to be transferred from a relatively slower advancing chain to a relatively faster advancing chain. Under these conditions, usually the trolley driving bar 26, which at the instant of transfer is moving more slowly than the dogs about to receive it, would merely be engaged by the forwardly directed face of one of the dog portions, unless at the instant of transfer the dogs on the two chains were laterally opposite to one another, in which case the adjacent receiving dog portion may, under the pressure of the received driving bar 26 engaging the outer face of such dog portion, be forced to temporarily swing forwardly about its pivot, so as to accommodate the driving bar, which would then be engaged by the next following dog 27 on the relatively faster moving chain.

Instead of forming each of the two dog portions 35, 36 as flat plates, each of the portions may be of cranked configuration, so formed that only the lateral extremities of the two portions of each dog 27 are disposed at different horizontal levels, namely at positions where the dog portions 27 of any two adjacent chains 10, 11 are adapted to overlap in a transverse sense at the position of transfer.

Such an arrangement facilitates the mounting of the two portions 35, 36 of each dog 27 on separate pivots, as opposed to a common pivot 37 if desired, without the two dog portions overlapping with one another adjacent the longitudinal centre line of their associated chain.

What I claim then is:

1. A floor conveyor for conveying goods, and of the kind comprising a pair of power advanced driving chains each disposed beneath a corresponding slot provided in the floor, and a plurality of wheeled goods supporting trolleys having dependent driving bars which in operation extend within one or the other of the two slots, and which are engaged at their lower ends with driving dogs provided on the driving chains and transfer means for transferring the goods supporting trolleys from one to the other of the driving chains at a transfer position provided in the floor at which position the two slots merge with one another, characterised in that the trolley driving dogs of each of the two chains each comprise two portions which extend in opposite transverse directions relative to their associated chain, with the lateral extremity of each portion of each dog at the position of transfer overlapping in a transverse sense with the lateral extremity of the adjacent portion of the dog on the other chain, so as to permit of a driving bar being advanced by a dog of one chain into the path of dog of the other chain, and each of the two portions of each dog is movable relative to the associated chain, in a direction both forwardly and towards the longitudinal centre line of the chain and against return loading means in such a manner as to permit of a trolley driving bar advanced by a relatively faster moving chain engaging with a rearwardly directed face of a dog portion on a relatively slower advancing chain to displace such engaged dog portion against its loading means and allow the driving bar to occupy a position in which it can engage with the forwardly directed driving face on the dog of the more slowly advancing chain to be driven therefrom.

2. A floor conveyor according to claim 1, characterised in that the lateral extremity of each portion of each of the dogs on one conveyor chain is disposed at a horizontal level different from that of the adjacent lateral portions of each of the dogs on the other laterally adjacent chain at the transfer position, so that the lateral extremities of the adjacent dog portions of the two chains overlap by extending one above the other at the transfer position so that the dogs on the two chains are incapable of engaging with one another at the transfer position.

3. A floor conveyor according to claim 1, characterised in that the two portions constituting each driving chain dog are separate from one another, and are mounted for independent pivotal movement in opposite directions to one another about a vertically extending pivot against loading means.

4. A floor conveyor according to claim 3, characterised in that the two separate portions of each dog are so mounted on a common pivot.

5. A floor conveyor according to claim 1 characterised in that each dog portion is formed as a flat plate, so as over its entirety to be disposed at the same horizontal level.

6. A floor conveyor according to claim 3 characterised in that the two portions of each dog are arranged to overlap with one another in a vertical sense at a position forwardly of their axis of pivoting, the two portions where they overlap being adapted simultaneously to engage with the trolley driving bar at positions spaced along the length thereof, so that the driving load is shared substantially equally between the two portions constituting each driving dog, whereby undesirable local overloading of the dog is minimized.

7. A floor conveyor according to claim 1, characterised in that each dog portion presents a rearwardly directed face disposed to the lateral side of the axis of pivoting of the dog portion, which face is inclined in a rearward direction towards the longitudinal centre line of the chain.

8. A floor conveyor according to claim 7, characterised in that each dog portion is of substantially right angled triangle configuration, as viewed in plan, so as to present a substantially straight forwardly directed bar engaging edge and a straight or curved rearwardly directed outer edge, which is inclined to the direction of advancement of the chain, and is disposed laterally to one side of a vertical longitudinally extending plane, containing the axis of pivoting of such a dog portion.

References Cited

UNITED STATES PATENTS

| | | | |
|---|---|---|---|
| 3,247,806 | 4/1966 | Dehne | 104—96 |
| 3,314,377 | 4/1967 | Dehne | 104—96 |

ARTHUR L. LA POINT, *Primary Examiner.*

D. F. WORTH, *Assistant Examiner.*